(12) United States Patent
Decker et al.

(10) Patent No.: US 12,485,084 B2
(45) Date of Patent: Dec. 2, 2025

(54) WOOD VINEGAR CONTAINING PRODUCT AND METHODS TO CONTROL ALGAE BLOOMS, REDUCE ODORS, AND OTHER APPLICATIONS

(71) Applicant: Bright Sand, Inc., Chattanooga, TN (US)

(72) Inventors: Earl R Decker, Windsor (CA); Judi Krzyzanowski, Roslin (CA)

(73) Assignee: Bright Sand, Inc., Detroit, MI (US)

( * ) Notice: Subject to any disclaimer, the term of this patent is extended or adjusted under 35 U.S.C. 154(b) by 14 days.

(21) Appl. No.: 17/841,093

(22) Filed: Jun. 15, 2022

(65) Prior Publication Data

US 2022/0401348 A1    Dec. 22, 2022

Related U.S. Application Data

(60) Provisional application No. 63/211,111, filed on Jun. 16, 2021.

(51) Int. Cl.

| | |
|---|---|
| *A01N 37/00* | (2006.01) |
| *A01N 35/02* | (2006.01) |
| *A01N 37/18* | (2006.01) |
| *A01P 13/02* | (2006.01) |
| *A61K 8/97* | (2017.01) |
| *A61L 9/01* | (2006.01) |

(52) U.S. Cl.
CPC ............... *A61K 8/97* (2013.01); *A01N 35/02* (2013.01); *A01N 37/18* (2013.01); *A01P 13/02* (2021.08); *A61L 9/01* (2013.01)

(58) Field of Classification Search
CPC A61K 8/97; A01N 35/02; A01P 13/02; A61L 9/01
See application file for complete search history.

(56) References Cited

FOREIGN PATENT DOCUMENTS

| CN | 101263829 A | | 9/2010 |
|---|---|---|---|
| CN | 112646625 A | | 4/2021 |
| JP | 2004229616 A | * | 8/2004 |
| KR | 1020040017033 A | | 2/2004 |
| KR | 100481202 B1 | | 4/2005 |
| KR | 1020070080437 A | | 8/2007 |
| KR | 1020120138416 A | | 12/2012 |

OTHER PUBLICATIONS

Dai et al. (2018) IOP Conf. Ser. Earth_Environ. Sci. 192: 012063.*
Seo Yang-Gon & Kim, Chang-Joon & Kim, Dae. (2015) Development of Adsorbents for Removal of Hydrogen Sulfide and Ammonia Using Carbon Black from Pyrolysis of Waste Tires. Clean Technology. KSCT.*
Takahara et al. (Study on odor control using wood vinegars. Nihon Koshu Eisei Zasshi. Jan. 1993;40(1):29-38. Japanese.*
Takahara et al. (Study on odor control using wood vinegars (II). 1994. Application of wood vinegars to piggery wastes. Japanese Journal of Public Health.*
Korean Intellectual Property Office, International Search Report dated Nov. 23, 2022, issued in PCT/US2022/072966, 5 pages.
Theaparat, Y., et al., "Physicochemistry and Utilization of Wood Vinegar from Carbonization of Tropical Biomass Waste," in Tropical Forests edited by Sudarshana, P., et al., Chapter 8, Aug. 1, 2018, pp. 163-183, available at http://dx.doi.org/10.5772/intechopen.7738, London.
Korean Intellectual Property Office, Results of Partial International Search, Annex to Invitation to Pay Additional Fees dated Sep. 27, 2022, in corresponding PCT Appln. No. PCT/US2022/072966 (3 pages).

* cited by examiner

*Primary Examiner* — Jeanette M Lieb
(74) *Attorney, Agent, or Firm* — Capitol City TechLaw, PLLC; Samuel P. Burkholder

(57) ABSTRACT

A method of controlling odor where the odor is generated by sources like decomposing organic matter in landfills or other sources is provided. A wood vinegar-containing solution, adjusted for the source of the odor, can be applied to the source of the odor. A method of improving the rate and completeness of settling of fine clays from oil sands tailings is also provided. Additional disclosure of a method of controlling algae bloom in a body of water is disclosed. The method includes the steps of providing a wood vinegar-containing solution, adjusting the composition of the wood vinegar-containing solution according to the states of both the body of water and the algae, respectively, then applying the wood vinegar-containing solution to the surface of a body of water, and inhibiting growth of the algae responsible for the algae bloom.

19 Claims, 2 Drawing Sheets

WOOD VINEGAR CONTAINING PRODUCT AND METHODS TO CONTROL ALGAE BLOOMS, REDUCE ODORS, AND OTHER APPLICATIONS

RELATED APPLICATIONS

The present application claims benefit from earlier filed U.S. Provisional Application No. 63/211,111, filed Jun. 16, 2021, which is incorporated by reference in its entirety for all purposes.

BACKGROUND

Field of Invention

The present disclosure relates to a product and method to control algae blooms and reduce odors from various sources including decaying organic matter, for instance, garbage, in landfills and elsewhere. Additionally, reduction of occurrence, severity, and duration of algae blooms in fresh, brackish, and salt water are all desired results from the presently disclosure composition and method.

The present disclosure also relates in its various embodiments to products and methods to: treat oil sands wastes, including the removal of clays from tailings water; remediate contaminated water by acting as either a surfactant or flocculant of various petrochemicals, their reaction products and additional dissolved or emulsified substances; treat fungal infections in plants and trees, including the treatment of various tree cankers and leaf rusts; treat bacterial infections in plants and trees including the treatment of multiple simultaneous crop infections; and promote and hasten seed germination, particularly in corn.

Discussion of the Related Art

As ocean and lake water temperatures increase as a result of climate change it is anticipated that the frequency of algae blooms in freshwater, brackish, as well as marine environments, will increase. Algae blooms have occurred in all manners of waterways, including the Great Lakes, waterways in Florida, marinas on global coastlines, and rural ponds or lakes near, or in some cases used for, animal husbandry. A recent case (June 2021) of a "marine mucilage" bloom was reported in the Marmara, Black and Aegean Seas to be suffocating coral, and was thought to be the result of increased sewage and industrial wastes.

Typically, only one or a few phytoplankton species are involved in a bloom and some blooms may be recognized by discoloration of the water resulting from the high density of pigmented cells. Although there is no officially recognized threshold level, algae can be considered to be blooming at concentrations of hundreds to thousands of cells per milliliter, depending on the causative species.

Some algae blooms are the result of excess nutrients, particularly phosphorus and nitrogen, and water enriched with these nutrients may experience enhanced and rapid growth of algae and other green plants. These nutrients become present in excess due to inputs from the runoff of fertilizers or animal wastes associated with large-scale agricultural activities; direct inputs of raw sewage, treated wastewater or industrial effluents (particularly phosphate containing soaps and detergents); or the atmospheric deposition of reactive nitrogen compounds produced primarily by combustion ($NO_x$) and agricultural ($NH_x$) sources.

With more nutrients available and the presence of sunlight, photosynthetic organisms can rapidly increase in number, and during their rapid growth and short lifespan, consume large amounts of dissolved oxygen in the water for respiration and decay. Should the dissolved oxygen content drop too low, fish and aquatic insects begin to suffocate, and a "dead zone" may result from this eutrophication.

Some species of bloom-causing algae produce toxins that may cause severe and/or long-lasting neurological, digestive, dermatological, or other, biological impacts on humans and wildlife.

The damage caused by algae blooms can significantly and negatively impact enjoyment and utilization of the affected body of water including tourism. Fish kills, general swimming hazards, odor, drinking water unavailability, cosmetic values, etc. are just a few of the undesirable consequences.

While preventive practices and measures to limit the amount of nitrogen and phosphorus-based nutrients entering waters are preferred by some, the results of these efforts have been mixed, and at best short-lived. Mechanical-based efforts, for example, by air bubbling, are somewhat limited to smaller water bodies. These devices enhance vertical mixing of phytoplankton with the goal of minimizing the formation of surface blooms of buoyant cyanobacteria. Even larger scale and more expensive efforts have included increasing the water flow through water bodies, to reduce water residence time, which inhibits cyanobacteria blooms.

Odors generated by decomposing materials in large landfills make them extremely bothersome to surrounding property owners. Reducing the release of malodorous gases from numerous sources is another aspect of the present teachings. Examples of malodorous gases include sulfide gases, such as, but not limited to dimethyl disulfide ("DMDS"), hydrogen sulfide ($H_2S$), and mercaptans (R—SH), whose presence in populated areas are often perceived of as an irritating nuisance, but at higher concentrations pose a health hazard.

Clearly there is a need for a formulation and a process for both the control of algae blooms, and the control of odors generated by decomposing organic matter, respectively. Additional embodiments related to pest and disease control in plants, environmental clean-up, and agricultural applications are disclosed herein.

SUMMARY OF THE DISCLOSURE

The present disclosure is directed to a method of controlling algae blooms in a body of water including the steps of providing a wood vinegar-containing solution; adjusting the composition of the wood vinegar-containing solution according to the states of both the body of water and the algae, respectively; applying the wood vinegar-containing solution to the surface of a body of water; and inhibiting growth of the algae responsible for the algae bloom.

This disclosure also includes a method of controlling odor generated by sources like decomposing organic matter in landfills by providing a wood vinegar-containing solution, adjusting the composition of the wood vinegar-containing solution according to the source of the odor, and applying the wood vinegar-containing solution to the source of the odor.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

Figure 1:
FIG. 1 is a black and white photograph of a butternut tree with a fungal canker prior to treatment according to one embodiment of the present disclosure.

Wood vinegar, also known as pyroligneous acid, is typically a dark brown liquid produced by the destructive distillation of wood and other plant materials. It is also a by-product from the production of activated carbon and charcoal. Wood vinegar has been known for long time as a smoking agent for meat.

During the production of activated carbon from hardwood sources wet scrubbers can be used on the process reactor, and raw wood vinegar and other products of the carbonization process can be collected from the extracted material. This process produces a liquid product with an initial pH ranging from 2.5 to 5.0. Other processes that can produce the raw wood vinegar containing process liquid include processes that produce a carbon-containing product, such as, without limitation, activated carbon, bio-char, carbon black, charcoal, and engineered carbon. Process that starts with a wood-containing feedstock such as, soft woods, hard woods, and bamboo, for example, will typically produce a process liquid that comprises wood vinegar among other compounds. In some embodiments, the oxygen level during the conversion process comprises less than 20%, 19%, 18%, 17%, 16%, 15%, 14%, 13%, 12%, 11%, 10%, 9%, 8%, 7%, 6%, 5%, 4%, 3%, or 2%, or within a range defined by any two of the preceding values. One method of producing activated carbon is described in U.S. Pat. No. 11,325,834 B2, issued on May 10, 2022, and a suitable apparatus is described in U.S. Pat. No. 8,715,582 B2, issued on May 6, 2014.

In some embodiments of the presently disclosed process, the raw wood vinegar-containing process liquid can be filtered to remove particulates and fines, and then treated to remove any further undesired impurities, or to reduce impurities to acceptable levels. In some embodiments, the amount of wood vinegar present in the process liquid is 1, 5, 10, 15, 20, 25, 30, 35, 40, 45, or up to 50% v/v of the process liquid. The raw wood vinegar-containing process liquid can also include various hydrocarbon based compounds, and carbon-containing products like, for instance, carbon black and other products. Additional factors are the amount and/or timing of the addition of any reagents, such as wood ash, to enhance the process.

Generally, wood vinegar can be composed of up to 75% acetic acid, about 1% other organic acids, a little less than 1% methanol with trace amounts of terpenes, aldehydes, ketones, and phenols. Various organic compounds that can be present in wood vinegar produced from poor quality feedstock and/or under inappropriate production conditions such as temperature, have been recognized to be potentially harmful when ingested, including formaldehyde, methanol, furan, benzopyrene and benzanthracene.

The presently disclosed wood vinegar-containing solution can, in some instances, be mixed with carbon black to provide visual confirmation of area of application, as well as increase the heat and gas adsorption of the applied solution. In some instances, the wood vinegar-containing process liquid will already have sufficient quantities of carbon containing materials to render the liquid dark or black in color.

For specific applications of the wood vinegar-containing solution whether to a body of water, a landfill, or other site, the specific properties of the solution can be prescribed to obtain the best outcome. Evaluation of the site conditions may be required to determine the amount of the wood vinegar-containing solution to be dispersed, the specific properties of the wood vinegar, and additional components in the solution among other properties.

The presently disclosed wood vinegar-containing composition can be further refined for each application from large- to small-scale algae blooms in varying states of growth to odor control on small to large size landfills. The refinement of the composition includes, for example, determining the appropriate chemical make-up including concentration of components, developing the appropriate mixture (ratio and pH) and adding binders, fining agents or other substances that reduce any potential undesirable side effects.

The presently disclosed wood vinegar-containing composition is comprised of primarily acetic acid (up to 75%) and various aromatic hydrocarbons including sesquiterpenes, and anthracenes. In some embodiments, the acetic acid concentration in the wood vinegar-containing composition can range from 1, 5, 10, 15, 20, 25, 30, 35, 40, 45, 50, 55, 60, 65, 70, up to 75% v/v or a range defined by any two of the preceding values of the composition. The presently disclosed wood vinegar composition can have pH ranging between 2 and 5.

Depending on the requirements for the application of the wood vinegar-containing solution, various additives can be incorporated into the treatment solution including surfactants, dispersants, and emulsifiers, for instance. In some applications, it may be preferred that the wood vinegar-containing solution stays on the top surface of the water while in other applications it may be preferable that the wood vinegar-containing solution sinks into the water and adheres to algae underneath the water's surface.

For algae bloom applications, it can be desirable to utilize the presently disclosed composition in a preventative fashion with treatment of water prior to an actual "bloom" event occurring in order to limit the amount of organic matter produced by the bloom. Determination of conditions of the water and/or the algae itself that lead to an eventual bloom can be instructive in planning "pre-bloom" treatments.

Following application of the wood vinegar-containing solution to an algae bloom, wood ash additional can help eliminate any undesired effects in aquatic ecosystems, for example, acidification, formation of secondary chemical by-products, loss of mineral cations, and other undesirable effects.

The effectiveness of the wood vinegar-containing solution as presently disclosed can be affected by various parameters including change in the pH, type of base cations, level of dissolved oxygen and other gases, and any direct environmental effects determined at each stage of the treatment process. In order to provide maximum coverage of the presently disclosed treatment solution, the dispersion of the solution can be accomplished by the use of crop duster-type planes, helicopters, and drones to apply the product to waterways for algae control and/or landfills for odor control. For treating smaller waterways, marinas, ponds, for instance, drones can be utilized as well as handheld sprayers to control algae blooms.

The presently disclosed wood vinegar-containing composition can also be used to control algae blooms and decrease the odor associated with the algae bloom. Spraying an affected body of water can control out-break of an algae bloom and prevent the complete eutrophication and oxygen depletion that can eventually lead to "dead zones" in the water.

Targeted algae blooms can be treated with the presently disclosed wood vinegar-containing solution by utilizing standard agricultural dispersion methods, such as crop duster-like airplanes and/or helicopters to spray large areas.

According to various embodiments, the presently disclosed wood vinegar-containing composition can also be used to reduce odor and methane emissions from landfills. The disclosed composition and method controls odor associated with organic decomposition such as that originating from landfills, wastewater treatment plants, agricultural nutrient management operations, and composting facilities. The origin of these unpleasant odors is sulfur-reducing bacteria that metabolize sulfur compounds into sulfides such as hydrogen sulfide ($H_2S$), hydrogen disulfide ($H_2S_2$) or mercaptans such as methanethiol ($CH_3SH$).

The presently disclosed wood vinegar-containing composition can be efficient and effective in controlling odor, methane emissions and vermin populations present in municipal solid waste landfills.

In some instances, the wood vinegar-containing composition can be used in sequential treatments of the landfill with wood ash added to limit negative impacts associated with acidity and the formation of potential by-products.

Many large landfills have problems with unpleasant odors arising from the generation of hydrogen sulfide ($H_2S$) and other reduced sulfur compounds, and methane— a greenhouse gas, from the natural biological decomposition of organic matter present in the waste being handled in the landfill. The presently disclosed wood vinegar-containing solution can then be dispersed over a landfill by land-based or aerial delivery methods. In some instances, the wood vinegar-containing solution can be solution mixed with a colorant, such as carbon black, to aid in distinguishing between treated and un-treated areas. The already dark color of the wood vinegar-containing solution, with the addition of a dark colorant like carbon black can also absorb more sunlight than wood vinegar alone and thus heats up the underlying waste material to speed up the decomposition, at the same time that the wood vinegar-containing solution is present to minimize any odor-producing substances. The carbon black can also assist in the reduction of any residual methane and $H_2S$ emissions via chemical adsorption (chemisorption); in addition to adsorbing odorous and eutrophying ammonia, and the greenhouse gas carbon dioxide ($CO_2$) also produced biologically in landfills and as detailed in various embodiments.

Application of the presently disclosed wood vinegar-containing composition on insect breeding areas, such as the decaying organic matter producing odors, can also greatly reduce the insect population. The wood vinegar-containing composition can also be applied to other insect breeding areas, especially mosquitoes, like standing pools of water to reduce their population.

Another beneficial aspect of the presently disclosed wood vinegar-containing solution is its ability to kill many viruses, bacteria, and fungi. It is recognized that there are also many viruses, bacteria and fungi that are not negatively impacted by the presently disclosed wood vinegar-containing solution.

An additional embodiment is the use of wood vinegar-containing solution at a 1-25% concentration applied either topically or via intracambrian injection to treat fungal infection in vegetation, particularly fungal cankers and leaf rusts in woody plants and trees. Topically the wood vinegar-containing solution can be applied via spray or droplet to the infected cankerous area, or sprayed onto foliage and stem, depending on the nature of the fungus and location of infection. A mild spray may also be used as a prophylactic in defense of disease spread.

An additional embodiment is the treatment of bacterial infections in plants and trees including the treatment of multiple simultaneous crop infections by use of topical spray, or in some circumstances, injection.

Another embodiment of the present disclosure is the use of a wood vinegar solution (ranging from 20%, 5%, 4%, 3%, 2%, 1%, 0.5%, 0.25% to 0.1%) as a seed soak, particularly for corn, to assist in earlier, complete, and synchronous germination of seeds. In some circumstances, it may also be possible to use wood vinegar-containing solution for these purposes via pre-treatment, aerosol, or soil application. Germination that was more complete, even, and faster than seeds soaked in pure water was obtained with the presently disclosed wood vinegar treatment. Evenly timed germination of crop seeds such as corn may help ensure more homogenous ripening which could improve harvest efficiency without 'dry-down'. Complete germination helps increase land-use efficiency and reduce seed wastage.

An additional embodiment of the present teachings is the use of wood vinegar-containing solution for the flocculation of fluids fine tailings from water in produced in oil sands, for example, the Alberta oil sands. Water from the oil sands process can contain 4-5% solids (fine clays such as kaolinite), which need to be removed from the liquid phase. Wood vinegar-containing solution may be used to flocculate these clays from the water where they settle and are separated by filtration without the use of toxic chemicals and polymers. Any changes to water chemistry/pH can be reversed via an additional component, such as wood ash, which also acts as a water fining agent.

One more embodiment of the present disclosure is to remediate contaminated water by acting as either a surfactant or flocculant of various petrochemicals, their reaction products, and additional dissolved or emulsified substances. The wood vinegar-containing solution has been found to act as an effective surfactant of hydrocarbons floating on a freshwater surface, whereby the wood vinegar-containing solution appears to alter surface tension and cause hydrocarbon droplets to sink and congregate, thus facilitating their removal.

The presently disclosed technology offers a potential alternative to current tailings treatment methods. Bench-scale testing shows promise for improving both settlement and cohesion in consolidated tailings deposits, particularly those dominated by the presence of deep fines.

Wood vinegar-containing solution, a by-product of emissions scrubbing in downdraft gasification units treating wood, acts as a flocculant of clay minerals in suspension and could eliminate the need for polymer-based flocculant pre-processing of fluid fine tailings. The water, which after treatment with the wood vinegar-containing solution contains very small amounts of clay or sand, can be removed from the clay/sand mixture for further processing.

Bench top testing of wood vinegar solutions, applied to fine clay and water mixtures substantially improved both the rate of settling and the completeness of the settling over gravitational settling alone. The wood vinegar solution (ranging from 20%, 5%, 4%, 3%, 2%, 1%, 0.5%, 0.25% to 0.1% or a range defined by any two of the preceding values wood vinegar) can be utilized to obtain the desired flocculation of the various dispersed solids from the overall oil sands processing waste material.

To minimize the acidification of the tailings with addition of wood vinegar, wood ash can be added to effectively neutralize the pH of wood vinegar treated consolidated tailings. In some instance, lime can be substituted or added to the wood ash. The wood ash also acts to strengthen the now neutralized upper surface to which it is added, significantly increasing geotechnical stability, and subsequently providing more options for reclamation. This effect is akin to the supplementation of cement with wood ash (10-15%) in concrete mixes to enhance various structural properties and decrease temperature- or moisture-related expansion and shrinking. Another benefit from the addition of wood ash is that it absorbs $CO_2$, a popular greenhouse gas [GHG], when exposed to air.

The presently disclosed treatment method can also be used as a dispersant of high molecular weight hydrocarbons. This dispersant property can have applications in hydrocarbons removal from tailings, soil, water, etc.

Other embodiments of the presently disclosed wood vinegar treatment can be used on butternut (*Juglans cinerea*) trees, a tree in the same genus as pecan and walnut, that is threatened by a fungus (*Sirococccus clavigignenti-juglandacearum*) that causes a lethal disease known as "Butternut canker". Infection occurs through damaged bark or open wounds and causes rapidly growing cankers—areas of necrotic tissue under the bark—that eventually kill these rare trees. Nationally across Canada, and especially in Ontario, where they are an endangered species, many of these trees are under attack.

All publications, articles, papers, patents, patent publications, and other references cited herein are hereby incorporated by reference herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

EXPERIMENTAL

Example 1

Odorous reduced sulfur compounds were produced in the lab by rearing sulfur-reducing bacteria in a sealed (anaerobic) jar. Frozen and mature plant-based kitchen compost were collected, and field-frozen cabbage leaves were added to ensure a source of sulfur. Approximately 8 ounces (224 g) of material was collected. On thaw, distilled water was added to a volume of 500 ml to cover the material and ensure saturation. After 90 days at between 70 and 75 degrees F. the jar's lid was extruded from gas production and a sulfurous odor was apparent on opening.

The mixture was coarsely filtered, and 15 ml of the filtered liquid (with suspended solids) was added to each of 10 tubes. The tubes were then corked for 8 hours to precipitate gas production. Wood vinegar at concentrations of 0.5%, 1% and 20% was applied to the liquid surface of 6 test tubes (2 each) using a spray aspirator and allowed to rest for an hour.

The four control tubes without any wood vinegar had obvious sulfurous odor on sniff tests, whereas such odors were undetectable from the 1% and 20% tubes. The 0.5% treatment tube had mild odor after treatment.

Example 2

Fine clay (bentonite) and water mixtures of 10%, 20% and 30% solids were prepared in test tubes of 500 ml volume. Wood vinegar solution at 20% by volume was added to one set of tubes, and control samples were untreated. The addition of the wood vinegar substantially improved rates of settling and settling completeness over gravitational settling alone (hours versus weeks, complete versus incomplete, respectively).

This testing showed that wood vinegar (at 20% volume concentration) can be used to help consolidate fluid fine clays at a rate significantly more rapid than the control. Even when the clay/water mixtures were thickened to 30% solids by volume, wood vinegar at 20% v. improved settlement rates over the control using gravitational settling alone. When wood vinegar (20%) was added to 100 ml samples with high solids concentration that were allowed to separate but the fluid above the settled clay was still cloudy, the fluid appeared clearer in just over one hour.

Example 3

The effect of wood vinegar on algae blooms can be investigated by treating algae growths with varying concentrations of wood vinegar. Suitable algae species for testing would include planktonic algae, cyanobacteria, 'blue green algae' (species in the genera *Anabaena, Aphanizomenon, Oscillatoria, Microcystis, Aphanocapsa,* or *Chroococcus*, for example) in fresh water; and dinoflagellates (also known as "red tide") in marine environment.

Wood vinegar solutions ranging from, for example, 0.1, 0.25, 0.5, 1.0, 2.0, 4.0, and so on to 20% concentration are used to treat the samples of algae. The decrease in live algae can be observed and recorded over time. In some tests, wood ash can be added to the wood vinegar solutions to regulate pH levels.

Example 4

Corn and melon seeds were used to measure the effect of wood vinegar treatment on germination. Two sets of 12 seeds/individual corn and melon plants were treated with varying amounts of wood vinegar solution. The two sets differed in their respective growing mediums: one set was 8 parts peat, one part sand, and one part perlite; the other set used the same mix with 10% biochar added. The eight treatments are presented below:

| Treatment # | Treatment Type | Treated with | No. of replicates |
|---|---|---|---|
| 1 | Control | N/A | 12 × 2 |
| 2 | Soak | dH2O | 12 × 2 |
| 3 | Soak | 0.5% WV | 12 × 2 |
| 4 | Soak | 0.25% WV | 12 × 2 |
| 5 | Prespray | 0.5% WV | 12 × 2 |
| 6 | Prespray | 0.25% WV | 12 × 2 |
| 7 | Spray on plant | 0.5% WV | 12 × 2 |
| 8 | Spray on plant | 0.25% WV | 12 × 2 |

The corn seeds soaked in 0.5% and 0.25% wood vinegar germinated first and second, respectively, at least two days earlier than the control corn, and one day earlier than the corn treated with higher concentrations wood vinegar (10% and 25%).

Melon seeds soaked with 0.5% and 0.25% wood vinegar also germinated one day ahead of seeds soaked at the higher concentrations, and at least 5 days before their counterparts that were soaked in plain rainwater.

Example 5

Corn seeds were soaked in pure rainwater, or in wood vinegar at concentrations of 1%, 0.5%, 0.25%, 0.1% or 20% for a period of 8, 6, 4 or 2 hours or were sprayed with one of the six treatment solutions just before planting. Each treatment was repeated on 12 seeds, all of which were planted (after treatment) in a growing medium consisting of 70% peat moss, 20% sand and 10% biochar in small, 2.5 cm×2.5 cm×5.08 cm deep (1"×1"×2") 12-cell containers with vented raised dome lids and monitored roughly every 12 hours for germination activity.

For all treatments, other than 20% wood vinegar and the control, seeds that were soaked for four hours germinated fastest. The most complete and consistent (evenly timed) germination occurred for seeds soaked in 0.5% wood vinegar solution.

Example 6

A young butternut (*Juglans cinerea*) tree showed symptoms indicative of butternut canker infection. See FIG. 1. The infection was treated early in the growing season (April) by injecting 0.1 ml of 1% wood vinegar into the tree cambium beneath the bark above and below the physical canker using a hypodermic needle. Three injections were performed at one-week intervals.

Figure 2:
FIG. 2 is a black and white photograph of the same butternut tree after treatment according to one embodiment of the present disclosure.

The injections were followed by a topical spraying of a 0.5% wood vinegar solution weekly for another 3 weeks in May. After these six treatments the canker shrank in size, lost its dark color and appeared to "heal" over. Visual improvement continued into the next growing season. See FIG. 2.

New and emergent cankers can be treated with topical wood vinegar-containing solution spray (at 20%) due to comorbidity with a leaf rust also affecting other surrounding plants. Cankers appeared to all heal over after one or two topical treatments, The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of controlling odor comprising:
   providing a wood vinegar-containing solution free of other odor controlling-compounds;
   adjusting the composition of the wood vinegar-containing solution according to the source of the odor;
   applying the wood vinegar-containing solution to the source of the odor;
   inhibiting any sulfur-reducing bacteria present in the source of the odor, and controlling the odor,
   wherein the source of the odor is present in one of a municipal solid waste facility, a wastewater treatment plant, or a landfill facility.

2. The method of controlling odor according to claim 1, further comprising:
   inhibiting the generation of odor causing components produced by the decomposition of organic matter.

3. The method of controlling odor according to claim 1 further comprising:
   adding a colorant to the wood vinegar-containing solution prior to applying the wood vinegar-containing solution to the source of the odor to indicate areas where sulfur-reducing bacteria have been inhibited.

4. The method according to claim 1 wherein:
   applying the wood vinegar-containing solution to selected portions of a landfill in an amount effective to reduce total gas emissions, hydrogen sulfide emissions, and methane emissions.

5. A method of controlling odor comprising:
   providing a solution containing at least 1% wood vinegar, and free of iron-containing compounds;
   adjusting the composition of the wood vinegar-containing solution according to the source of the odor;
   applying the wood vinegar-containing solution to the source of the odor;
   inhibiting any sulfur-reducing bacteria present in the source of the odor, and controlling the odor,
   wherein the source of the odor is present in one of a municipal solid waste facility, a wastewater treatment plant, or a landfill facility.

6. The method of controlling odor according to claim 5, further comprising:
   inhibiting the generation of odor causing components produced by the decomposition of organic matter.

7. The method of controlling odor according to claim 5, further comprising:
   adding a colorant to the wood vinegar-containing solution prior to applying the wood vinegar-containing solution to the source of the odor.

8. The method according to claim 5 wherein:
   applying the wood vinegar-containing solution to selected portions of a landfill in an amount effective to reduce total gas emissions, hydrogen sulfide emissions, and methane emissions.

9. The method according to claim 5, wherein the wood vinegar-containing solution comprises a concentration of wood vinegar adjusted to a range of at least 1% to 25%, optimized for bacterial inhibition.

10. The method according to claim 9, wherein the wood vinegar-containing solution further comprises additional additives tailored to enhance antibacterial efficacy.

11. The method according to claim 1, wherein the wood vinegar-containing solution comprises a concentration of wood vinegar adjusted to a range of 0.1% to 25%, optimized for bacterial inhibition.

12. The method according to claim 11, wherein the wood vinegar-containing solution further comprises additional additives tailored to enhance antibacterial efficacy.

13. A method for preventing generation of odiferous gases comprising:
   providing a solution comprising wood vinegar;
   applying the solution to odiferous gas-producing substances;
   inhibiting any sulfur-reducing bacteria present in the odiferous gas-producing substances, and
   controlling the odor,
   wherein the odiferous gas-producing substances comprise gases produced in one of a municipal solid waste facility, a wastewater treatment plant, or a landfill facility.

14. The method of controlling odor according to claim 13, further comprising:
   inhibiting the generation of odiferous gases produced by the decomposition of organic matter.

15. The method of controlling odor according to claim 13, further comprising:

adding a colorant to the solution prior to applying the solution to the odiferous gas-producing substances.

16. The method according to claim 13, wherein the solution comprises a concentration of wood vinegar adjusted to a range of 0.1% to 25%, optimized for bacterial inhibition.

17. The method according to claim 13, wherein the solution further comprises additional additives tailored to enhance antibacterial efficacy.

18. The method according to claim 13, further comprising adding carbon black to the solution in sufficient quantities to assist in the reduction of methane and $H_2S$ emissions.

19. The method according to claim 13, further comprising adding carbon black to the solution in sufficient quantities to adsorb ammonia.

* * * * *